United States Patent
Debastiani et al.

(10) Patent No.: US 11,542,206 B2
(45) Date of Patent: Jan. 3, 2023

(54) POROUS REFRACTORY CAST MATERIAL, ITS USE AND PRODUCTION

(71) Applicant: VESUVIUS USA CORPORATION, Champaign, IL (US)

(72) Inventors: Duane L. Debastiani, Moon Township, PA (US); Xianxin Zhou, Pittsburgh, PA (US)

(73) Assignee: Vesuvius USA Corporation, Champaign, IL (US)

( * ) Notice: Subject to any disclaimer, the term of this patent is extended or adjusted under 35 U.S.C. 154(b) by 0 days.

(21) Appl. No.: 16/494,425

(22) PCT Filed: Apr. 4, 2018

(86) PCT No.: PCT/US2018/026001
§ 371 (c)(1),
(2) Date: Sep. 16, 2019

(87) PCT Pub. No.: WO2018/194831
PCT Pub. Date: Oct. 25, 2018

(65) Prior Publication Data
US 2020/0087214 A1 Mar. 19, 2020

Related U.S. Application Data

(60) Provisional application No. 62/486,155, filed on Apr. 17, 2017.

(51) Int. Cl.
*C04B 38/00* (2006.01)
*C04B 35/103* (2006.01)
(Continued)

(52) U.S. Cl.
CPC ........ *C04B 38/0061* (2013.01); *C04B 35/103* (2013.01); *C04B 35/106* (2013.01);
(Continued)

(58) Field of Classification Search
CPC .................................................. C04B 35/043
See application file for complete search history.

(56) References Cited

U.S. PATENT DOCUMENTS

| | | |
|---|---|---|
| 1,027,004 A | 5/1912 | Schwerin |
| 2,021,520 A | 11/1935 | Reichmann |

(Continued)

FOREIGN PATENT DOCUMENTS

| | | | | |
|---|---|---|---|---|
| CS | 239236 B1 | * | 1/1986 | |
| DE | 4436043 C1 | * | 4/1996 | ............. B22D 7/102 |

(Continued)

OTHER PUBLICATIONS

English language translation of RU2610482C1, generated on Aug. 19, 2021 with Espacenet website (https://www.epo.org/searching-for-patents/technical/espacenet.html).*

(Continued)

*Primary Examiner* — Mark Ruthkosky
*Assistant Examiner* — Julia L Rummel
(74) *Attorney, Agent, or Firm* — Blue Filament Law PLLC

(57) ABSTRACT

A porous refractory cast material contains a closed refractory aggregate fraction having a minimum particle size and a maximum particle size; the ratio of maximum particle size to minimum particle size is 10:1 or less. This closed refractory aggregate fraction comprises all of the porous refractory cast material having a particle diameter greater than 0.1 mm. The porous refractory cast material also contains a binder phase containing refractory selected from calcium aluminate cement, alumina phosphate, hydratable alumina, colloidal silica and combinations thereof. Also disclosed is a metallurgical vessel with an interior lining incorporating the porous refractory cast material.

16 Claims, 2 Drawing Sheets

(51) Int. Cl.
   *C04B 35/106* (2006.01)
   *C04B 35/44* (2006.01)
   *C04B 35/447* (2006.01)

(52) U.S. Cl.
   CPC ............ *C04B 35/44* (2013.01); *C04B 35/447* (2013.01); *C04B 38/0041* (2013.01); *C04B 38/0058* (2013.01); *C04B 2235/5427* (2013.01); *C04B 2235/602* (2013.01); *Y10T 428/249953* (2015.04); *Y10T 428/249956* (2015.04)

(56) References Cited

U.S. PATENT DOCUMENTS

| | | | |
|---|---|---|---|
| 2,463,979 | A | 3/1949 | Langrod |
| 3,524,548 | A | 8/1970 | McDonald et al. |
| 3,963,508 | A * | 6/1976 | Masaryk ............ C04B 7/32 106/693 |
| 3,981,352 | A | 9/1976 | Nurminen et al. |
| 4,278,544 | A | 7/1981 | Takashima |
| 4,528,099 | A | 7/1985 | Reiger et al. |
| H48 | H * | 4/1986 | Heichel ............ C04B 38/063 264/44 |
| 4,629,483 | A | 12/1986 | Stanton |
| 5,177,035 | A | 1/1993 | Gee et al. |
| 5,861,057 | A | 1/1999 | Berg et al. |
| 5,998,322 | A | 12/1999 | Hoshino et al. |
| 6,247,221 | B1 | 6/2001 | Ritland et al. |
| 6,313,056 | B1 | 11/2001 | Li et al. |
| 6,508,852 | B1 | 1/2003 | Hickman et al. |
| 2012/0276387 | A1 | 11/2012 | Hattanda et al. |
| 2014/0060727 | A1 | 3/2014 | Stouffer et al. |
| 2015/0145186 | A1 | 5/2015 | Olson, III |

FOREIGN PATENT DOCUMENTS

| | | |
|---|---|---|
| GB | 2410282 A | 7/2005 |
| JP | H10251739 A | 9/1998 |
| RU | 2610482 C1 * | 2/2017 |
| WO | 20150191426 A1 | 12/2015 |
| WO | 2016153693 A1 | 9/2016 |

OTHER PUBLICATIONS

Back, A.; Ravitz, S.; Tame, K.; "Formation of Dithionate and Sulfate in the Oxidation of Sulfur Dioxide by Manganese Dioxide and Air" from "Report of Investigations 4931", United States Department of the Interior, 1952, p. 79-80.*

CS 239236 B1 English language translation; generated in Apr. 29, 2022 with PE2E Search software.*

DE 4436043 C1 English language translation; generated in Apr. 29, 2022 with PE2E Search software.*

* cited by examiner

POROUS REFRACTORY CAST MATERIAL, ITS USE AND PRODUCTION

CROSS-REFERENCE TO RELATED APPLICATIONS

This application is a U.S. national stage application, filed under 35 U.S.C. § 371, of International Application No. PCT/US2018/026001, which was filed on Apr. 4, 2018, and which claims priority to U.S. Application No. 62/486,155, filed Apr. 17, 2017, the contents of each of which are incorporated by reference in this specification.

BACKGROUND OF THE INVENTION

(1) Field of the Invention

The present invention generally relates to a refractory cast material used in metallurgical processes and vessels such as a tundish, its use, and a method of its production.

(2) Description of the Related Art

In metal forming processes, metal melt is transferred from one metallurgical vessel to another, to a mould or to a tool. For example, a tundish of large capacity is regularly fed with metal melt by a ladle transferring metal melt from a furnace to the tundish. This allows the continuous casting of metal from the tundish to a tool or mould. Flow of metal melt out of metallurgic vessels is driven by gravity through nozzle systems located at the bottom of the vessels, usually provided with a gate system to control (open or close) the flow of metal melt through said nozzle system. In order to resist the high temperatures of metal melts, the walls of the vessels are lined with refractory material.

Metal melts, in particular steel, are highly reactive to oxidation and must therefore be sheltered from any source of oxidative species. Small amounts of aluminum are often added to remove oxygen. In practice, it appears that often this is not enough to prevent the formation of oxide inclusions in the melt that produce defects in a final part produced from the melt. It is reported that a 10 kg steel casting may contain up to one billion non-metallic inclusions, most of them being oxides. Attempts have been made to remove inclusions by a variety of filtration or flotation processes.

Inclusions may be the result of reactions with the metal melt; these inclusions are known as endogenous inclusions. Exogenous inclusions are those in which materials not resulting from the metal melt, such as sand, slag, and debris of nozzles; exogenous inclusions are generally more predominant than endogenous inclusions.

Endogenous inclusions comprise mostly oxides of iron (FeO), aluminium ($Al_2O_3$), and of other compounds present in, or in contact with the melt, such as MnO, $Cr_2O_3$, $SiO_2$, $TiO_2$. Other inclusions may comprise sulfides and, to a minor extent, nitrides and phosphides. Since metal melts are at very high temperatures (of the order of 1600° C. for low carbon steels) it is clear that the reactivity of an iron atom with an oxide is very high and reaction cannot be prevented.

To date, most measures to reduce the presence of inclusions in a steel casting is to retain them in the metallurgical vessel in which they were formed. Various devices composed of refractory materials have been designed to selectively retain portions of the metal melt in which inclusions are concentrated. These devices may be constructed with various physical configurations, and may be provided with openings, passages, channels or pores for this purpose.

A number of porous ceramic materials have been produced for specialized purposes in metallurgical vessels and processes.

U.S. Pat. No. 1,027,004 (1912) describes the production of SiC (carborundum) porous ceramics produced by finely grinding SiC powder to make a slurry or paste, and molding and firing the slurry or paste in a non-oxidizing atmosphere. The result is a porous ceramic with micropores used for manufacture of diaphragms. Most of the pores are closed and the filtration efficiency is low.

U.S. Pat. No. 2,021,520 (1935) describes the production of porous ceramics, such as alumina ceramics, by the production of a slip or crumbly mass, then pressing or ramming, and finally firing the material to a temperature above 1600° C. Specified applications for these porous ceramics include wet filters for Gooch crucibles for alkaline liquids, porous plates permitting the passage of air in clarification plants, and plates for surface combustion.

U.S. Pat. No. 2,463,979 (1949) teaches the preparation of $Al_2O_3$ porous ceramics with 20% to 50% porosity by mixing 40% to 80% of unground (200 mesh) and 60% to 20% ground (325 mesh) alumina into a mud-like paste, drying the paste at 150° C. and firing the dried material within a temperature range of 1300° C. to 1850° C.

U.S. Pat. No. 5,177,035 (1993) discloses $Al_2O_3$ based ceramic filters for molten liquid filtration. The filter forming composition contains 65 vol %-75 vol % of +4-6 mesh $CaCl_2$) (or urea or wax) granules as pore formers to create pores in the size range from about 500 microns to about 1300 microns by way of leaching or melting the pore forming materials. Resins are used as binders.

U.S. Pat. No. 5,861,057 (1999) contains a description of a drainage concrete for water management having porosity in the range of 10 vol %-35 vol %. The concrete consists of 10 wt %-35 wt % hydraulic cement as binder and 65 wt %-85 wt % of aggregates with a size of 2 mm-32 mm (5 mm-8 mm preferred) and binder additives from 5 wt % to 40 wt % of the hydraulic cement binder.

GB 2,410,282 (2005) is directed to a water management system including a porous concrete layer. The porous concrete comprises 15-21 wt % cement, 5 wt % fine sand and 65 wt %-75 wt % coarse aggregates such as gravels, limestones, granites, etc. having a single size of 10 mm. The concrete mix also comprises a microsilica additive to the extent of 5%-15% by weight of cement in the porous concrete. The porous concrete has a minimum air void content (porosity) of approximately 15%.

US 2015/0145186 (2015) and WO 2015/191426 (2015) relate to ceramic foam filters made by coating a slurry to reticulated polymer foams (normally polyurethane foam) and then drying and firing the shape to burn out the foam to have a porous structure. The slurry may be mullite, MgO or other refractory materials.

U.S. Pat. No. 6,508,852 (2003) shows a porous honeycomb particulate filter formed by a plugging method. The filters are used for a diesel engine or an automotive engine. The pore channels are straight and not tortuous.

U.S. Pat. No. 3,524,548 (1970) is directed to a rigid filter for molten aluminum filtration, containing fused alumina or tabular alumina aggregates with frits as binders. The aggregates have average particle sizes ranging from 0.165 mm to about 2.8 mm; the pores have an average diameter from 0.25 mm to 0.92 mm, and the porosity is low. The filter therefore has a low filtration efficiency. Frit powders, containing low-melting materials such as 15% to 80% boron oxide, are used in a binder to bond the aggregates. Frits must be fired at a certain temperature to enable glass bonding, so an item produced with this technology will have low bonding strength in the green stage. The patent does not contain a teaching of the use of a closed refractory aggregate fraction.

U.S. Pat. No. 4,528,099 (1985) is directed to a structure of two filters having large and small pore diameters for filtrating molten materials. Hollow corundum spheres are used as aggregates with low melting frits as binder mixing with a glazing mixture. U.S. Pat. No. 4,528,099 does not teach a closed refractory aggregate fraction in which the ratio of maximum particle size to minimum particle size is 10:1 or less.

U.S. Pat. No. 5,998,322 (1999) is directed to a filter medium for molten metals with 5% to 12% by weight $B_2O_3$, as a low-temperature inorganic binder. There is no teaching of the use of a closed refractory aggregate fraction.

BRIEF SUMMARY OF THE INVENTION

The present invention relates to refractory materials with configured porosity, and to the use of refractory materials with configured porosity in various structures for the reduction of the formation of endogenous inclusions in a metallurgical vessel, and for the isolation and retention of endogenous inclusions outside the body of a volume of molten metal. Materials of the present invention are refractory compositions containing aggregates and binders that are able to withstand the thermal, physical and chemical environment of a metallurgical process. Materials of the present invention make use of cements such as calcium aluminate cement or binders such as $Al_2O_3$ that give green strength to the formulation. Materials of the present invention can be used green or pre-fired. In materials of the present invention, porosity is open, continuous and tortuous, being designed to permit the entry of molten metal, and to retain the molten metal.

Materials of the present invention may be used for filtration, to permit infiltration, to provide insulation, to serve as gas diffusers, and for other functions in the processing of hot gas or molten metal liquid.

It has been found that certain compositional features, alone or in particular combinations, produce a porous refractory cast material, with an engineered structural configuration, that may be used in the containment, direction, treatment and retention of molten materials. These features include:

1) A closed refractory aggregate fraction, or coarsest refractory grain fraction, makes up 70% or greater by weight, 75% or greater by weight, 80% or greater by weight, 85% or greater by weight, 90% or greater by weight, or 95% or greater by weight of the dry composition.

2) The closed refractory aggregate fraction is a closed fraction in terms of particle size, in which the largest particles in the closed refractory aggregate fraction have a mesh value that is 1.5 times, or less, than the mesh values of the smallest particles in the closed refractory aggregate fraction, in which the largest particles in the closed refractory aggregate fraction have a mesh value that is 2.0 times, or less, than the mesh value of the smallest particles in the closed refractory aggregate fraction, in which the largest particles in the closed refractory aggregate fraction have a mesh value that is 2.5 times, or less, than the mesh value of the smallest particles in the closed refractory aggregate fraction, in which the largest particles in the closed refractory aggregate fraction have a mesh value that is 3.0 times, or less, than the mesh value of the smallest particles in the closed refractory aggregate fraction, in which the largest particles in the closed refractory aggregate fraction have a mesh value that is 4.0 times, or less, than the mesh value of the smallest particles in the closed refractory aggregate fraction, in which the largest particles in the closed refractory aggregate fraction have a mesh value that is 5.0 times, or less, than the mesh value of the smallest particles in the closed refractory aggregate fraction, in which the largest particles in the closed refractory aggregate fraction have a mesh value that is 8.0 times, or less, than the mesh value of the smallest particles in the closed refractory aggregate fraction, or in which the largest particles in the closed refractory aggregate fraction have a mesh value that is 10.0 times, or less, than the mesh value of the smallest particles in the closed refractory aggregate fraction.

3) The closed refractory aggregate fraction contains at least 80 wt % of the portion of the composition composed of particles with a diameter equal to or greater than 100 microns, at least 85 wt % of the portion of the composition composed of particles with a diameter equal to or greater than 100 microns, at least 90 wt % of the portion of the composition composed of particles with a diameter equal to or greater than 100 microns, at least 95 wt % of the portion of the composition composed of particles with a diameter equal to or greater than 100 microns, or 100% of the portion of the composition composed of particles with a diameter equal to or greater than 100 microns.

4) The smallest particles in the closed refractory aggregate fraction are larger by a factor of 2, or 5, or 10, of mesh size or particle diameter, than the largest particles in the remainder of the composition. Alternately, the composition can be described as having an unpopulated gap in particle size distribution, with a factor of 2, or 5, or 10 between the smallest particle diameter or mesh size limit to the gap and the largest particle diameter or mesh size limit to the gap, wherein the smallest particle size diameter or mesh size limit to the gap has a value of 45 microns or less. The percentage of the weight, excluding solvent, of the formulation within the unpopulated gap is equal to or less than 5 weight percent, equal to or less than 2 weight percent, equal or to less than 1 weight percent, or equal to or less than 0.5 weight percent.

5) The closed refractory aggregate fraction is entirely composed of aggregate, or particles, with particle diameters mesh values from and including 12 mm to and including 6 mm, from and including 6 mm to and including 3 mm, from and including 3 mm to and including 1 mm, from and including 1 mm to and including 0.5 mm, from and including 20 mm to and including 6 mm, or from and including 20 mm to and including 10 mm.

6) The closed refractory aggregate fraction is entirely composed, consists, or consists essentially, of high-temperature refractory material. High refractory materials include alumina (including tabular, fused and brown fused forms), bauxites, magnesia, zirconia, calcium oxide, silica, spinel, calcium aluminates, mullite, olivine, forsterite, zircon, calcium silicate, alumina zirconia silicate, and combinations of these materials, and exclude frit.

7) The composition contains, in addition to the closed refractory aggregate fraction, a binder system containing refractory binder that is ferrous-capable. A ferrous-capable refractory binder is a binder that is capable of producing a formulation that may be used at temperatures above 1400 degrees C. Examples of ferrous-capable refractory binders are calcium aluminate cement, alumina phosphate, hydratable alumina and colloidal silica.

8) The composition has an open porosity from and including 20 vol % to and including 60 vol %, 20 vol % to and including 50 vol %, 25 vol % to and including 45 vol %, 20 vol % to and including 40 vol %, 25 vol % to and including 40 vol %, 30 vol % to and including 60 vol %, 30 vol % to and including 50 vol %, or 30 vol % to and including 40 vol %.

9) The composition has a tortuous porosity. Tortuous porosity is porosity in which pores do not take the form of a straight line or an arc, or in which pores exhibit a plurality of turns.

10) A binder phase produced from (a) fines, (b) binders, and/or (c) a slurry.

11) A bilayer structure, containing two layers in communication with each other. The two layers differ in the mesh values, or particle size distributions, of the closed refractory aggregate fraction. Alternatively, a multilayer structure, containing a plurality of layers in sequential communication with each other. Each of the layers differs from the other layers in the mesh values, or particle sizes distributions, of the closed refractory aggregate fraction.

The invention also relates to lining structure for a metallurgical vessel, comprising a porous refractory material comprising at least one of characteristics 1-11 previously described. The invention also relates to the use of such a lining structure in a metallurgical vessel.

The invention also relates to a metallurgical vessel having an interior and an exterior, wherein the interior of the metallurgical vessel comprises a lining structure comprising a porous refractory material comprising at least one of the characteristics 1-11 previously described.

The invention also relates to a process for the minimization of oxidation of a molten metal, comprising (a) transferring molten metal to a vessel having a lining structure comprising a porous refractory material comprising at least one of the characteristics 1-11 previously described, and (b) transferring the molten metal out of the vessel.

Particular embodiments of the invention relate to a porous refractory cast material comprising a closed refractory aggregate fraction having a minimum particle size and a maximum particle size, wherein the ratio of maximum particle size to minimum particle size is 10:1 or less, 5:1 or less, or 2:1 or less; and a binder phase comprising refractory binder, wherein the closed refractory aggregate fraction comprises 100 wt % of the material having a particle diameter greater than 0.1 mm, greater than 0.2 mm, greater than 0.5 mm, greater than 1 mm, greater than 2 mm, or greater than 5 mm. The weight percentage of the aggregate fraction to the combined weight of the aggregate fraction and the binder phase may be within the range from and including 70 weight percent to and including 98 weight percent, from and including 75 weight percent to and including 98 weight percent, from and including 80 weight percent to and including 98 weight percent, from and including 85 weight percent to and including 98 weight percent, and from and including 90 weight percent to and including 98 weight percent. The ratio between the size of the smallest particles of refractory aggregate and the largest particles in the binder phase is at least 2:1, at least 5:1, at least 10:1, or at least 20:1. The porous refractory cast material of the present invention may have a porosity in the range from and including 20 vol % to and including 60 vol %, 20 vol % to and including 50 vol %, 25 vol % to and including 45 vol %, 20 vol % to and including 40 vol %, 25 vol % to and including 40 vol %, 30 vol % to and including 60 vol %, 30 vol % to and including 50 vol %, or 30 vol % to and including 40 vol %. The pores may be tortuous.

In particular embodiments of the invention, 100 wt % of the closed refractory aggregate fraction has a particle size with a diameter greater than 1 mm, with a diameter greater than 2 mm, with a diameter greater than 5 mm, or with a diameter greater than 10 mm. The closed refractory aggregate fraction may comprise alumina (including tabular, fused and brown fused forms), bauxite, magnesia, zirconia, calcium oxide, silica, spinel, calcium aluminates, mullite, olivine, forsterite, zircon, calcium silicate, alumina zirconia silicate and combinations of these materials.

In particular embodiments of the invention, the binder phase may comprise reactive aluminas, calcined alumina, tabular alumina, fused alumina, mullite, carbon, silicon carbide, zirconium dioxide, magnesium oxide, aluminum silicates, silica in colloidal or nanosilica forms, fume silica, spinel, bauxite, chromium oxide and combinations thereof. 100 wt % of the binder phase may consist of particles having diameters of 500 microns or less, of 200 microns or less, of 100 microns or less, or 50 microns or less.

The invention also relates to a structure containing at least two layers as previously described in communication with each other, wherein a first layer contains aggregate having a first layer minimum aggregate particle size, and a second layer contains a second layer maximum aggregate particle size, and the first layer minimum aggregate particle size is greater than the second layer aggregate maximum particle size. The invention further relates to a structure composed of a structure containing a first composition as previously described and a second composition as previously described, in which the first composition is formed into a cylindrical structure that may be solid or may be symmetrically hollow with respect to a cylindrical axis, and wherein the second composition is in communication with the first composition. In certain embodiments, the second composition is disposed on the radial exterior of the first composition.

The invention also relates to the use of the porous refractory cast material previously described as lining structure in high-temperature metallurgical or foundry vessels, such as ladles, tundishes and crucibles. Devices formed from these materials may be used as deep bed filters for the liquid purification of aluminum or metal alloys. The materials of the invention may be infiltrated with metal to form brake pads. The materials of the invention may be used as gas or liquid diffusers. The invention further relates to a metallurgical vessel having an interior and an exterior, wherein the interior of the metallurgical vessel comprises a lining structure comprising a porous refractory cast material as previously described. The invention further relates to a process for producing a lining structure in a metallurgical vessel, comprising (a) providing a refractory backing lining, having an interior surface, on the interior of a metallurgical vessel, and (b) affixing a cast porous refractory material as previously described on the interior surface of the refractory backing lining.

The invention also relates to a process for the minimization of oxidation of a molten metal, comprising (a) transferring molten metal to a vessel having a lining structure comprising a porous refractory cast material as previously described, and (b) transferring the molten metal out of the vessel.

BRIEF DESCRIPTION OF THE DRAWINGS

Various embodiments of the present invention are illustrated in the attached Figures.

DETAILED DESCRIPTION OF THE INVENTION

Figure 1:
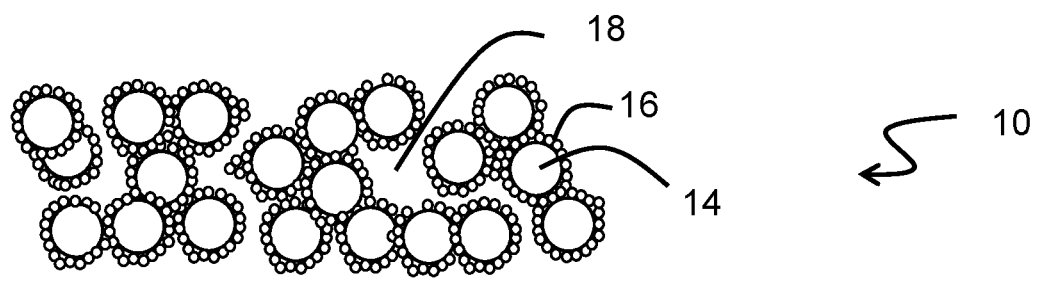
FIG. 1 is a schematic sectional view of structure containing porous refractory cast material according to the present invention.

It has been found that the presence or combination of certain compositional features produces a porous cast refractory material which is able to withstand the high temperatures and chemical reactivity encountered in the containment of metallurgical processes. The material exhibits the structural strength required in metallurgical applications such as refractory linings. The material contains pores of a width sufficient to admit molten materials, and a tortuosity sufficient to constrain the molten material and to admit impurities.

Refractory linings are composed of high temperature resistant materials in the form of a wall or panel to contain heat, molten metals and/or slags in furnaces and/or vessels. The refractory materials may include bricks of alumina, bauxite, fireclay, MgO, or graphite-containing pressed bricks or shapes; monolithic refractories such as vibration castable materials, self-flow castable materials, plastic refractories and gunning mixtures; and dry vibration mixtures. Refractory linings may be used in tundishes, ladles, blast furnace troughs, electric arc furnace (EAF) bottoms, and vessels or confinement devices such as troughs, runners, and channels. The porous cast refractory material of the present invention can be used for attracting slag/impurities, insulating vessels, inhibiting the entry of oxygen into molten metals, and reducing erosion or corrosion of a lining.

The aggregates useful in practicing the present invention are refractory materials, retaining their strength at high temperatures. Refractories are considered to be nonmetallic materials having those chemical and physical properties that make them applicable for structures, or as components of systems, that are exposed to environments above 538 degrees C. (1000 degrees F.). Refractory aggregates are distinguished from aggregates used in concrete for construction applications, which may consist of crushed rocks such as limestone, slag or granite. Due to the presence of materials such as $Na_2O$ and $K_2O$, and carbonate decomposition of the aggregates, the concrete strength and modulus of elasticity of these materials gradually decreases with an increase in temperature, and when the temperature exceeds approximately 300 degrees C., the decline in strength becomes more rapid. When the 500 degrees C. threshold is passed, the compressive strength of concrete usually drops by 50% to 60%, and the concrete is considered fully damaged. By drying concrete material, the extent of the phenomenon is significantly reduced, or even eliminated, at up to 400 degrees C. Above this temperature, the mismatch of thermal deformations between the aggregates, which expand, and cement paste, which undergoes shrinkage, prevails and results in the development of cracks. Significant cracking continues, thus altering the material mechanical properties. Refractory aggregates are also distinguished from ceramic frits, which have melting temperatures below 800 degrees C., and may contain sodium silicate and potassium silicate.

The coarse aggregates useful in practicing the present invention include alumina ($Al_2O_3$), magnesia (MgO), zirconia ($ZrO_2$), calcium oxide (CaO), silica ($SiO_2$) or any combined refractory materials such as spinel ($Al_2O_3+MgO$), calcium aluminates ($CaO+Al_2O_3$), mullite ($Al_2O_3+SiO_2$), olivine and forsterite, ($MgO+SiO_2$), zircon ($ZrO_2+SiO_2$), calcium silicate ($CaO+SiO_2$), and AZS ($Al_2O+ZrO_2+SiO_2$).

The coarse aggregates useful in practicing the present invention can have a blocky, rectangular, fibrous, rod, angular or spherical or spherulite shape. Ceramic spherulites may be formed from refractory minerals such as alumina, MgO, silica, or combined materials such as mullite or spinel. Spherulites are available, for example, with diameters in the range of 1 mm to 25 mm. Spherulites may have uniform sizes or have a range of sizes. Spherulites may be dense or lightweight. Spherulites formed by roll-granulation are porous; and have a foliated inner structure resembling the interior of a cabbage. These foliated spherulites have a structure that can retain impurities and slags, and that provides some insulating effects.

The strength of the porous refractory material is provided by the binder component through cementitious bonding, chemical bonding or ceramic sintering bonding. The corresponding three types of binders are refractory cementitious slurry, chemical solution, and organic polymer. The corresponding three types of resulting binder phases after processing are refractory binder, precipitated solution, and organic polymer.

Cementitious binder may be made of fine refractory particles (having diameters less than 100 microns (100 micrometers, 0.1 mm), or less than 88 microns (88 micrometers, 0.088 mm), or less than 50 microns (50 micrometers, 0.05 mm), or less than 25 microns (25 micrometers, 0.025 mm) including refractory binder, refractory fine powder and some additives such as a water reducing agent. The fine dry materials are mixed with water to produce a slurry (a suspension) to coat and bond the refractory aggregates together. The cement may be a high temperature refractory binder that is ferrous-capable, and is thus usable at temperatures above 1400 degrees C. The refractory binder may be calcium aluminate cement, alumina phosphate, hydratable alumina, colloidal silica, and combinations of these materials.

Chemical solution binder may contain phosphate such as monoalumina phosphate (either as a liquid or as a solution produced by mixing powder with water), colloidal silica, hydratable alumina (either as a suspension or as a solution produced by mixing powder with water), or silicone glue.

Organic polymer binder may contain polymer glue or resin.

The binder used in the matrix may contain calcium aluminate cement, calcium-magnesium-aluminate cement, alpha bond cement, Portland cement, mono-aluminum phosphate (MALP), clays, reactive alumina, hydratable alumina, colloidal silica and combinations thereof. In certain embodiments, the matrix material according to the present invention does not contain cement.

Other raw materials used in the matrix may include reactive aluminas, calcined alumina, tabular alumina, fused alumina, mullite, carbon (graphite or carbon black), silicon carbide, zirconium dioxide, magnesium oxide, aluminum silicates (such as kyanite, andalusite, or sillmanite), fume silica, bauxite, chromium oxide and combinations thereof. The portion of the formulation having diameters in the range of 0.01 to 10 microns, or 0.01 to 50 microns, or 0.01 to 100 microns, also known as the fines, may contain reactive aluminas and fume silicas.

The matrix may also contain dispersing agents, plasticizers, anti-foaming or foaming agents and de-airing components. These agents are well known in the art.

FIG. 1 is a schematic sectional view of a structure 10 containing porous refractory cast material according to the present invention. Particles of refractory aggregate fraction 14 are bound to each other by binder phase 16, shown as individual particles. Tortuous passages 18 provide open porosity without taking the form of a straight line or arc.

Figure 2:
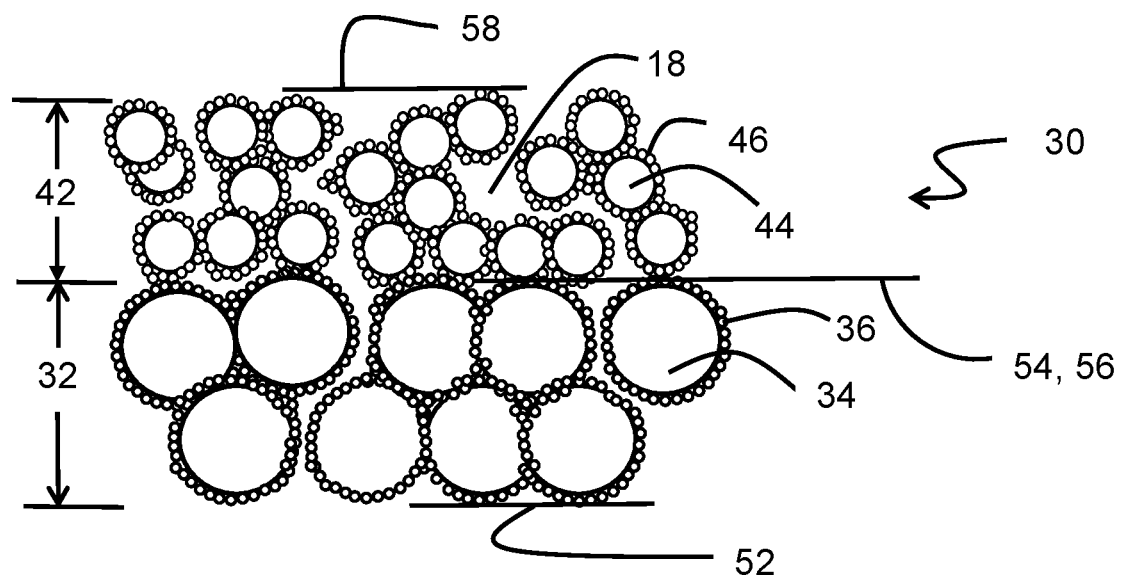
FIG. 2 is a schematic sectional view of a structure containing porous refractory cast material according to the present invention.

FIG. 2 is a schematic sectional view of a multilayer structure 30 containing porous refractory cast material according to the present invention. First layer 32 contains porous refractory cast material containing particles of refractory aggregate fraction 34 that are bound to each other by binder phase 36, shown as individual particles. Second layer 42, in communication with first layer 32, contains porous refractory cast material containing particles of refractory aggregate fraction 44 that are bound to each other by binder phase 46. Tortuous passages 18 provide open porosity without taking the form of a straight line or arc.

Each layer of multilayer structure 30 possesses two major faces. The major faces are a pair of faces, disposed on opposite sides of the layer and having the maximum areas of all faces of the layer. In FIG. 2, first layer 32 has major faces 52 and 54. Second layer 42 has major faces 56 and 58. Major face 54 of first layer 32 is in communication with major face 56 of second layer 42.

Figure 3:
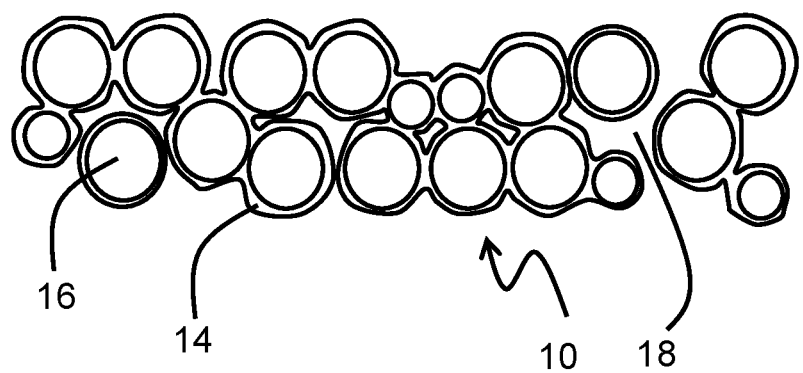
FIG. 3 is a sectional view of structure containing porous refractory cast material according to the present invention.

FIG. 3 is a sectional view of a structure 10 containing porous refractory cast material according to the present invention. Particles of refractory aggregate fraction 14 are bound to each other by binder phase 16. Tortuous passages 18 provide open porosity without taking the form of a straight line or arc.

Figure 4:
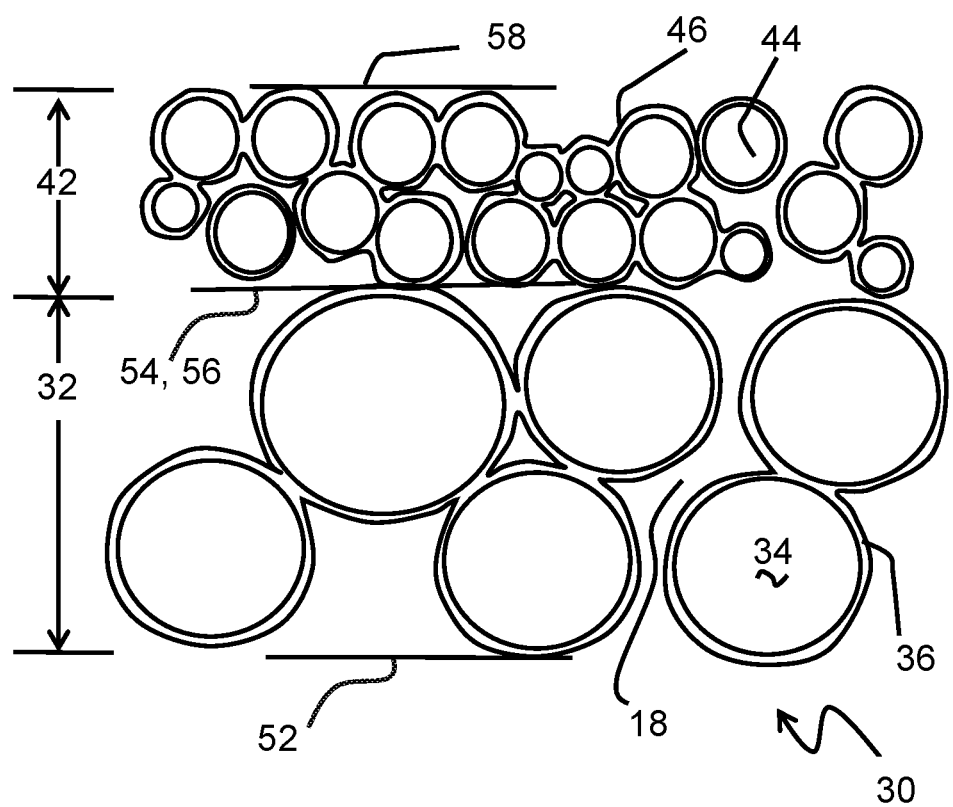
FIG. 4 is a sectional view of a structure containing porous refractory cast material according to the present invention.

FIG. 4 is a sectional view of a multilayer structure 30 containing porous refractory cast material according to the present invention. First layer 32 contains porous refractory cast material containing particles of refractory aggregate fraction 34 that are bound to each other by binder phase 36. Second layer 42, in communication with first layer 32, contains porous refractory cast material containing particles of refractory aggregate fraction 44 that are bound to each other by binder phase 46. Tortuous passages 18 provide open porosity without taking the form of a straight line or arc.

Example I

The composition of the present invention may be prepared from aggregates and binders.

Binders that may be used in the present invention include particulate suspensions or slurries, liquid solutions, or liquid binders such as glues based on resins or polymers.

In a cementitious binder, refractory fine particles having diameters or mesh passage sizes of 100 microns or less, composed of materials such as reactive alumina, fume silica, MgO or calcium aluminate cement, may be used. Additives such as dispersants may be added to improve flowability. The solid ingredients may then be mixed in water in a suspension mixer to produce a homogeneous slurry with good fluidity. For some formulations it is advisable to combine the slurry with aggregate within 1 hour of the slurry's production.

Liquid solution binder may be produced by the mixture of a suitable chemical compound with water. Compounds that may be combined with water to produce a liquid solution binder include aluminum hydrogen phosphate, aluminum dihydrogen phosphate, sodium silicate, potassium silicate, hydratable alumina in the form of an ultra-fine powder or nano alumina, or commercially available liquid solutions such as colloidal silica or colloidal alumina may be used.

Liquid binders such as resins, polymer glue, silicone glue or polyurethane glue may be used to form the composition of the present invention.

To form a refractory composition according to the invention, portions of aggregates and binders may be weighted out in the desired weight ratio. Binder is slowly added to the aggregates, and the combination of binder and aggregates is mixed in a mixer such as a cement mixer. After all of the binder is added to the aggregates, mixing may be continued for a period of time, such as 5 minutes, to ensure that all al the aggregates have a uniform binder coating.

The combination of binder and aggregates may then be used to form a refractory piece. The mixed aggregates and binder may then be placed into a mold, and the surface may be smoothed and settled by tamping or vibration. A subsequent layer or layers may be added to the mold in this manner. The mold is then covered with a plastic film and the mixture is allowed to harden or set. After setting is completed, the piece is demolded from the mold and the film is removed. The formed piece is allowed to undergo curing at temperatures, in the range of 15-30 degrees C., for example. The piece may then be dried in an oven at a temperature of, for example, 110 degrees C. for a period of time of, for example, 24 hours. The resulting piece may be used directly, or may be fired at a temperature of, for example, 1400-1600 degrees C. for a period of time of, for example, 3 hours, which depends on the dimensions of the piece.

The present invention also relates to the use of the lining structure containing the refractory composition as previously described in a metallurgical vessel, and to a metallurgical vessel having an interior and an exterior, wherein the interior of the metallurgical vessel comprises a lining structure as previously described.

The present invention also relates to a process for the minimization of oxidation of a molten metal during transfer, comprising (a) transferring molten metal to a vessel having a lining structure as previously described, and (b) transferring the molten metal out of the vessel.

The present invention also relates to a process for forming a lining of a metallurgical vessel comprising the steps of (a) mixing a closed refractory aggregate fraction having a minimum particle size and a maximum particle size, wherein the ratio of maximum particle size to minimum particle size is 10:1 or less, with a binder phase comprising refractory binder selected from the group consisting of calcium aluminate cement, alumina phosphate, hydratable alumina, colloidal silica and combinations thereof, wherein the closed refractory aggregate fraction comprises 100 wt % of the material having a particle diameter greater than 0.1 mm, to form a castable refractory mixture, and (b) casting the castable refractory mixture in contact with the interior of the metallurgical vessel to form the lining. In embodiments of the invention, the castable refractory mixture is cast into a volume defined between a mould and the interior of the metallurgical vessel.

Other characteristics and advantages of the invention will become evident from the following detailed description and the implementation examples.

Example II

Various aggregate to binder ratios may be used in the inventive formulation.

In particular embodiments of the invention, aggregates used were tabular alumina T64 grains (supplied by Almatis, Inc.) with a closed particle size range between 12 mm and 6 mm. The slurry binder contained reactive alumina, silica fume, and calcium aluminate cement combined with water and additives such as dispersing agents. For a weight ratio of aggregate to slurry of 70/30 or less, excessive slurry binder was found to block the pores (the gaps between individual grains of aggregate) and, in some cases, a pool of slurry formed at the bottom of the piece. If the weight ratio is 85/15 or higher, all the pores are open. But if the weight ratio is 95/5 or higher, the binder strength is insufficient to bind the aggregates together. A weight ratio of 90/10 was found to provide open pores and adequate binder strength.

TABLE 1

Weight Percentages of Aggregates and Slurry Binders

| Formulation # | Particle Size | Aggregate | Slurry binder | Remark |
|---|---|---|---|---|
| TAB-1 | 12-6 mm | 70% | 30% | Blocked |
| TAB-2 | 12-6 mm | 80% | 20% | Partially blocked |
| TAB-3 | 12-6 mm | 85% | 15% | Open |
| TAB-4 | 12-6 mm | 90% | 10% | Open |
| TAB-5 | 12-6 mm | 95% | 5% | Open |

Example III

Comparison of Aggregate Particle Size Ranges in the Formation of Refractories

Formulations with the same aggregate chemical composition (tabular alumina T64) but with various closed particle size distribution ranges were studies. The largest aggregate particle range used was a 20 mm to 6 mm fraction; the smallest aggregate particle range used was a 1.0 mm to 0.5 mm fraction. It was observed that satisfactory pieces could be contained for aggregate closed particle size distribution ranges if the particles were larger than 100 microns. The ratio of largest to smallest aggregate particles in the closed particle size distribution ranges may be from and including 10 to and including 1. Smaller differences in size between the largest particles and smallest particles in the closed particle size distribution range produce pieces with more gaps and pores. A ratio between 5 and 1, a ratio between 3 and 1, a ratio between 2.5 and 1.5, and a ratio of 2 have been found to produce satisfactory refractory. TAB-7a is an example of a formulation, having an overall particle size distribution range with a 4:1 ratio of largest particle size to lowest particle size, in which a single closed refractory aggregate composition is formed from two refractory aggregate compositions that have adjacent particle size distributions.

TABLE 2

Comparison of Refractory Material Formed from Aggregates of Various Sizes

| Formulation # | Particle Size | Aggregate | Slurry binder | Remark |
|---|---|---|---|---|
| TAB-6 | 6-3 mm | 90% | 10% | Open |
| TAB-7 | 3-1.0 mm | 90% | 10% | Open |
| TAB-7a | 12-6 mm<br>6-3 mm | 45%<br>45% | 10% | |
| TAB-8 | 1.0-0.5 mm | 90% | 10% | Open |
| TAB-9 | 20-10 mm | 90% | 10% | Open |
| TAB-10 | 20-6 mm | 90% | 10% | Open |

Example IV

Comparison of Aggregate Chemical Composition in the Formation of Refractories

Formulations with the same aggregate to slurry binder ratio, but with different aggregate chemical compositions, were tested. The aggregates included spinel AR 90 or AR 78, dead burned magnesite, fused magnesite, calcium hexaaluminate (CA6, as supplied by Almatis Ltd. under the brand name Bonite), white fused alumina, brown fused alumina, and bauxite. All were found to be capable of forming pieces with open pores.

TABLE 3

Comparison of Aggregate Chemical Compositions

| Formulation # | Materials | Aggregate | Slurry binder | Remark |
|---|---|---|---|---|
| TAB-11 | Spinel 6-3 mm | 90% | 10% | Open |
| TAB-12 | Magnesite 6-3 mm | 90% | 10% | Open |
| TAB-13 | Bonite 6-3 mm | 90% | 10% | Open |
| TAB-14 | Fused alumina 6-3 mm | 90% | 10% | Open |
| TAB-15 | Bauxite 6-3 mm | 90% | 10% | Open |
| TAB-16 | Magnesite 6-3 mm<br>Tabular alumina 6-3 mm | 45%<br>45% | 10% | Open |

Example V

Study of Aggregate Shape in the Formation of Refractories

The aggregates can take the form of spheres or angular grains. Pores in the resulting refractory will be open if an appropriate ratio of aggregate to slurry binder is used and the aggregates have a uniform slurry binder coating.

TABLE 4

Comparison of Aggregate Sizes and Shapes

| Formulation # | Materials | Aggregate | Slurry binder | Remark |
|---|---|---|---|---|
| TAB-17 | Alumina feed balls 20-10 mm | 90% | 10% | Open |
| TAB-18 | Mullite balls 8-7 mm | 90% | 10% | Open |
| TAB-19 | Mullite balls 3-2 mm | 90% | 10% | Open |
| TAB-20 | Angular alumina | 90% | 10% | Open |

Example VI

Cementitious Binder Slurry

The binder slurry may be hydraulically bonded by refractory binder. The binder slurry can include the calcium aluminate cement Secar-71 (from Kerneos Aluminate Technologies), reactive alumina A-3000FL (from Almatis Ltd USA), silica fume 955U (from ELKEM AS Materials), and/or pulverized sodium polyphosphate glasses in the form of, for example, additive Budit 8H (from BASSTECH). Table 5 shows, with 90% of tabular alumina T64 of size 12 mm–6 mm, the different binder combinations that can be used to bind the aggregates together.

TABLE 5

Cementitious Binder Slurry

| Formulation # | Cement | Reactive Alumina | Silica Fume | Additives | Water |
|---|---|---|---|---|---|
| TAB-21 | 10% | — | — | 0.1% | 3.5% |
| TAB-22 | 5% | 5% | — | 0.1% | 3.5% |
| TAB-23 | 5% | — | 5% | 0.1% | 3.5% |
| TAB-24 | 4% | 3% | 3% | 0.1% | 3.5% |
| TAB-25 | 3% | 4% | 3% | 0.1% | 3.5% |
| TAB-26 | 3% | 4% | 3% | — | 4.5% |

Example VII

Solution or Polymer Binders

The binder slurry may also be in the form of chemical solution/liquid or polymer resin. Table 6 shows, with 96% of tabular alumina T64 of size 12 mm–6 mm, the different liquid chemical binder or polymer resins that can be used to bond the aggregates together.

TABLE 6

Solution or Polymer Binders

| Formulation # | Colloidal silica | Hydratable Alumina | Phosphate | Sodium Silicate | Epoxy Resin |
|---|---|---|---|---|---|
| TAB-27 | 4% | — | — | — | — |
| TAB-28 | — | 4% | — | — | — |
| TAB-29 | — | — | 4% | — | — |
| TAB-30 | — | — | — | 4% | — |
| TAB-31 | — | — | — | — | 4% |

Example VIII

Complete Formulations

Table 7 provides some formulations. The first three formulations (TAB 32-TAB 34) use the same aggregates and binders but with different aggregate/binder ratios. The 5 formulations TAB 35 to TAB 39 use different aggregates but with the same slurry binders. The three formulations TAB-40 to TAB-42 use the same aggregates but with different slurry binders.

TABLE 7

Complete Formulations

| Component | TAB-32 | TAB-33 | TAB-34 | TAB-35 | TAB-36 | TAB-37 |
|---|---|---|---|---|---|---|
| $Al_2O_3$ 12-6 mm | 85% | 90% | 95% | — | — | — |
| $Al_2O_3$ 6-3 mm | — | — | — | 90% | — | — |
| $Al_2O_3$ 3-1 mm | — | — | — | — | 90% | — |
| MgO 6-3 mm | — | — | — | — | — | 85% |
| Cement | 5% | 3% | 2% | 3% | 3% | 5% |
| Reactive Alumina | 5% | 4% | 2% | 4% | 4% | 5% |
| Silica fume | 5% | 3% | 1% | 3% | 3% | 5% |
| Additives | 0.1% | 0.1% | 0.1% | 0.1% | 0.1% | 0.1% |
| Water | 3% | 3% | 3% | 3% | 3% | 3% |

| Component | TAB-38 | TAB-39 | TAB-40 | TAB-41 | TAB-42 |
|---|---|---|---|---|---|
| $Al_2O_3$ 12-6 mm | — | — | 90% | 90% | 90% |
| Spinel 6-3 mm | 85% | — | — | — | — |
| Bonite 6-3 mm | — | 85% | — | — | — |
| Cement | 5% | 5% | 10% | 5% | 5% |
| Reactive Alumina | 5% | 5% | — | 5% | — |
| Silica fume | 5% | 5% | — | — | 5% |
| Additives | 0.1% | 0.1% | 0.1% | 0.1% | 0.1% |
| Water | 3.5% | 3.5% | 3% | 3% | 3% |

Percentages in Table 7 are weight percentages with respect to the total weight of the solid components of the formulation.

A formulation of the present invention may be installed in the interior of a metallurgical vessel in the form of a precast panel, and fixed in place by cement or mechanical support. On-site installation of the formulation of the present invention may be carried out by placing a mold in a metallurgical vessel so that clearance between the interior wall of the metallurgical vessel and the exterior wall of the mold defines a volume to be occupied by the formulation. The formulation is then placed in this volume and settled. The formulation is allowed to harden or set. It may then be subjected to a curing process and a drying process.

Devices formed from the materials of the present invention contain a controllable porous structure and exhibit high temperature resistance. Therefore, various uses can be contemplated for them. The materials may be formed into pre-cast panels (pre-fabricated) or directly cast into molds to form specific shapes. Devices formed from these materials may be used as filtration devices, e.g., to remove inclusions from hot metal liquid, or impurities from any solutions or gases. The material may be used to form dams, weirs or baffles for use in refractory devices to filter molten metal. The materials may be used to form linings for high temperature metallurgical or foundry vessels, such as ladles, tundishes and crucibles. Devices formed from these materials may be used as deep bed filters for the liquid purification of aluminum or metal alloys. The materials of the invention may be infiltrated with metal to form brake pads. The materials of the invention may be used as gas or liquid diffusers.

Numerous modifications and variations of the present invention are possible. It is, therefore, to be understood that within the scope of the following claims, the invention may be practiced otherwise than as specifically described.

We claim:

1. A porous refractory cast material comprising
a closed refractory aggregate fraction comprising porous spherulites consisting essentially of alumina and having a minimum particle size and a maximum particle size, wherein the ratio of maximum particle size to minimum particle size is 10:1 or less; and
a ferrous-capable binder phase comprising refractory binder selected from the group consisting of calcium aluminate cement, alumina phosphate, alumina formed from hydratable alumina, silica formed from colloidal silica and combinations thereof;
wherein the closed refractory aggregate fraction comprises 100 wt % of the material having a particle diameter greater than 0.1 mm, and wherein the weight percentage of the aggregate fraction to the combined weight of the aggregate fraction and the binder phase is within the range from and including 85 weight percent to and including 98 weight percent; and
wherein the porous spherulites have a foliated inner structure.

2. The porous refractory material of claim 1, wherein the ratio of maximum particle size to minimum particle size is 5:1 or less.

3. The porous refractory material of claim 1, wherein the ratio of maximum particle size to minimum particle size is 2:1 or less.

4. The porous refractory material of claim 1, wherein the weight percentage of the aggregate fraction to the combined weight of the aggregate fraction and the binder phase is within the range from and including 90 weight percent to and including 98 weight percent.

5. The porous refractory material of claim 4, wherein the refractory binder comprises calcium aluminate cement, and wherein the binder phase further comprises
(a) reactive alumina; and
(b) silica.

6. The porous refractory material of claim 1, wherein 100 wt % of the closed refractory aggregate fraction has a particle size with a diameter of at least 5.0 mm.

7. The porous refractory material of claim 1, wherein the binder phase further comprises a material selected from the group consisting of reactive alumina, calcined alumina, tabular alumina, fused alumina, carbon, zirconia, magnesia, fume silica, bauxite, chromium oxide and combinations thereof.

8. The porous refractory material of claim 1, wherein the ratio between the size of the smallest particles of refractory aggregate and the largest particles in the binder phase is at least 10:1.

9. The porous refractory material of claim 1, wherein the ratio between the size of the smallest particles of refractory aggregate and the largest particles in the binder phase is at least 2:1.

10. The porous refractory material of claim 1, wherein 100 wt % of the binder phase consists of particles having a size of 100 microns or less.

11. The porous refractory material of claim 1, wherein the porosity is in the range from and including 20 vol % open porosity to and including 60 vol % open porosity.

12. The porous refractory material of claim 1, wherein the porosity is tortuous.

13. A porous refractory cast material structure comprising
a first layer comprising a first porous refractory material according to claim 1, and having a first layer minimum aggregate particle size; and
a second layer comprising a second porous refractory material according to claim 1, and having a second layer maximum aggregate particle size
wherein the first layer minimum aggregate particle size is greater than the second layer aggregate maximum particle size.

14. A metallurgical vessel having an interior and an exterior, wherein the interior of the metallurgical vessel comprises a lining structure comprising a porous refractory cast material according to claim 1.

15. A process for the minimization of oxidation of a molten metal, comprising
a) transferring molten metal to a vessel having a lining structure comprising a porous refractory cast material according to claim 1, and
b) transferring the molten metal out of the vessel.

16. The porous refractory material of claim 1, wherein 100 wt % of the closed refractory aggregate fraction has a particle size with a diameter of at least 3.0 mm, and at most 6.0 mm.

* * * * *